UNITED STATES PATENT OFFICE.

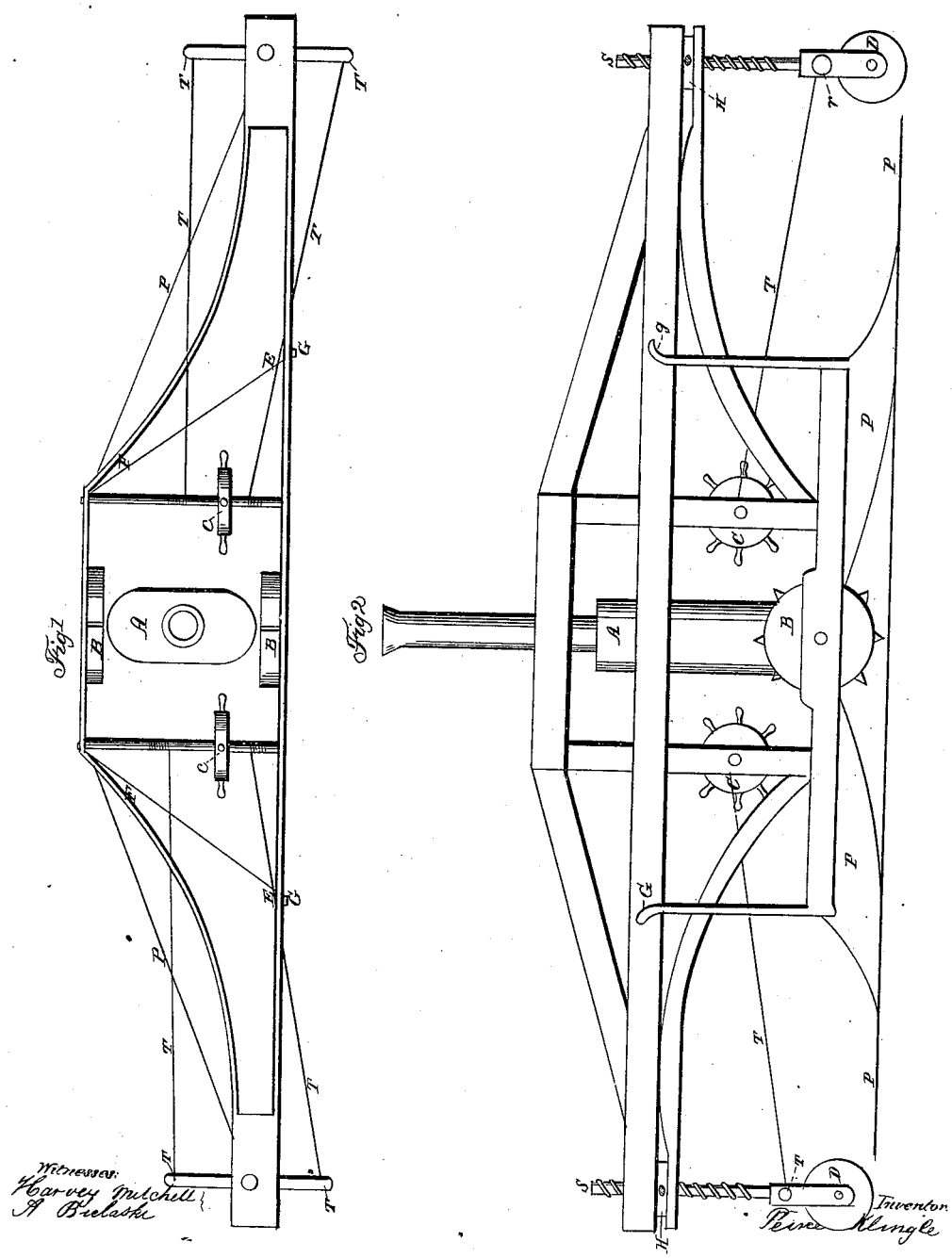

PEIRCE KLINGLE, OF DISTRICT OF COLUMBIA.

IMPROVEMENT IN STEAM-PLOWS.

Specification forming part of Letters Patent No. 19,427, dated February 23, 1858.

*To all whom it may concern:*

Be it known that I, PEIRCE KLINGLE, in the county of Washington and District of Columbia, have invented a new and useful machine for the purpose of plowing land by steam-power; and I hereby declare that the following is a full and exact description thereof, reference being had to the accompanying drawings, and to the letters of reference marked thereon.

To enable others skilled in the art to make and use my invention, I will proceed to describe its construction and operation.

The nature of my invention consists in placing the plow in advance of the machine to permit the wheels to track behind it and within the furrow upon its bottom, and in putting a plow at each end to permit a reverse as well as an advance motion to the machine.

To each end of the frame E F F E, I attach the plows P and P, Plate I, Plate II, Figure 1, hinging at E F and F E. I place the bearing-wheels B and B within the frame in the center of the machine, their rims coming through the floor, the power being applied by cranking upon their axle.

The boiler A, I place immediately over the bearing-wheels, the principal weight being thus directly upon them.

At both ends of the machine, in front of the point of each plow, I place the steering-wheels D and D, Plate I, Plate II, Fig. 2, working in the ends of the curved frames H and H, which project from the main floor over and beyond each plow. Each steering-wheel can be raised or lowered at pleasure by means of the screw-posts G and S, and is governed by the tiller-wheels C and C, with the ropes indicated for that purpose.

The *modus operandi* is as follows: The operator stands at C, Plate I. He first lets down the plow P which hinges at E F, until the point touches the ground, when he makes it firm by securing the governing-rod on lever G.

He then raises the steering-wheel D by working up the screw-post S, raising it to a height above the plow-point corresponding to the depth to which he may desire to plow. The weight of the machine being upon the central axle, the man's weight by its leverage at C brings down the end upon which he stands, and it rests upon the point of the plow. Steam being now let on, the machine begins to advance, forcing the plow deeper and deeper into the soil until the steering-wheel D again touches the ground, which restrains the plow from going any deeper, and causes it to maintain an even depth, while the wheel itself, bearing the weight of the plow in resisting its continual effort to bury itself in the ground, becomes available for steering purposes, guiding the machine in any direction required. The bearing-wheels B and B follow behind the plow upon the smooth bottom of the furrow, while the other steering-wheel is idle. Having reached the end of the furrow, the operator moves to the other end of the machine, takes his stand at the tiller-wheel, when he makes an adjustment similar to the one described above, and reversing the steam he turns upon the land of the furrow parallel to the one just plowed, and continues thus to run his machine backward and forward in a manner similar to the performance of a hillside-plow.

Having thus described the construction of the machine and its operation, what I claim as my invention, and desire to secure by Letters Patent, is—

The combination of driving-wheels B B and plows P P with the steering-wheels D D, the whole being constructed, arranged, and operated substantially in the manner and for the purpose herein set forth.

PEIRCE KLINGLE.

Witnesses:
HARVEY MITCHELL,
A. BIELASKI.

Z. Lyford,
Loom Picker,
N° 19,428. Patented Feb. 23, 1858.
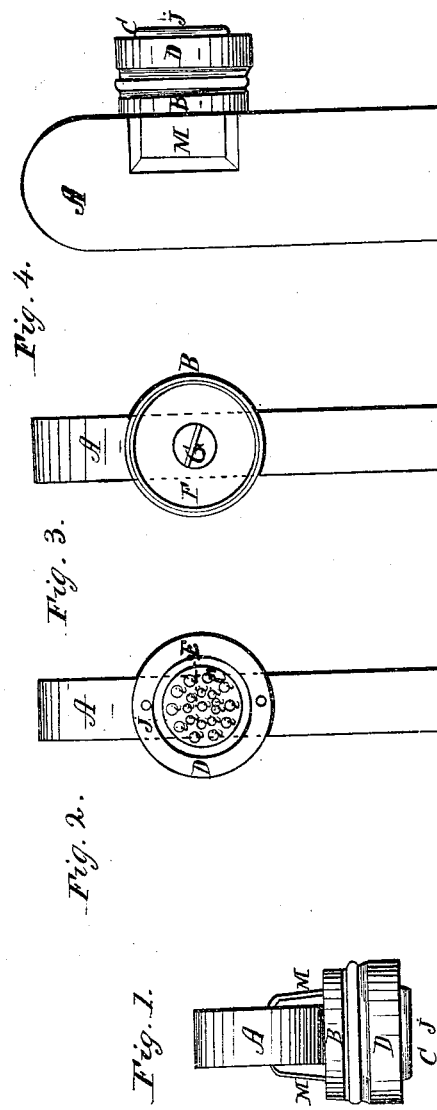
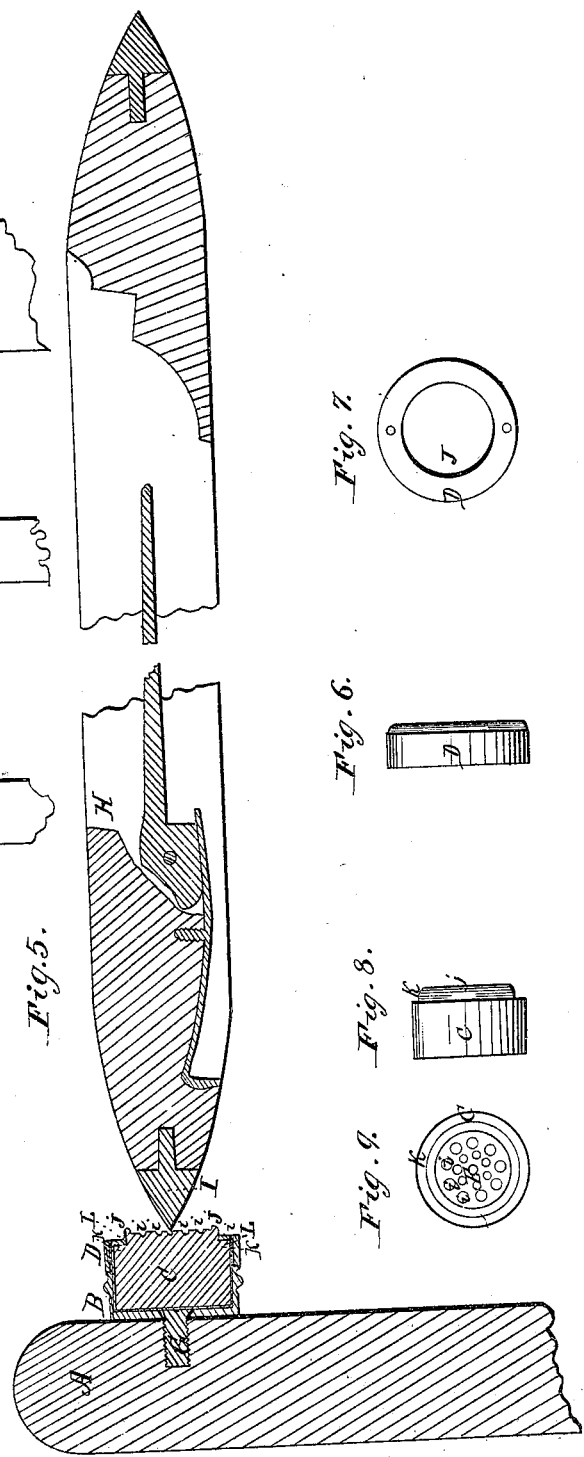
Witnesses
Abiel Pevey
E. W. Scott
Inventor
Zebedee Lyford